(12) United States Patent
Ohkawa et al.

(10) Patent No.: US 6,306,972 B1
(45) Date of Patent: Oct. 23, 2001

(54) POLYMER BLEND COMPOSITIONS BASED ON ISOTACTIC POLYPROPYLENE HOMOPOLYMER AND INJECTED MOLDED ARTICLES THEREOF

(75) Inventors: Kenichi Ohkawa; Shin-ichi Kondo; Moriyasu Shimojo, all of Ichihara (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/079,222

(22) Filed: May 15, 1998

(30) Foreign Application Priority Data

May 15, 1997 (JP) .................................... 9-125655

(51) Int. Cl.$^7$ ................ C01L 23/10; C08K 3/34
(52) U.S. Cl. ............... 525/240; 525/95; 525/232; 525/241; 524/451
(58) Field of Search .................. 525/240, 95, 232, 525/241; 524/451

(56) References Cited

U.S. PATENT DOCUMENTS

| | | | |
|---|---|---|---|
| 4,272,431 | * 6/1981 | Schepers | 524/505 |
| 5,302,653 | * 4/1994 | Nishio et al. | 524/451 |
| 5,391,618 | 2/1995 | Yamamoto et al. | . |
| 5,639,816 | * 6/1997 | Yamaguchi et al. | 524/451 |
| 5,723,527 | * 3/1998 | Sadatoshi et al. | 524/451 |
| 5,744,535 | * 4/1998 | Akasawa et al. | 524/451 |
| 5,750,612 | * 5/1998 | Zyagawa et al. | 524/451 |
| 5,763,534 | * 6/1998 | Srinivasan et al. | 525/240 |
| 5,773,515 | * 6/1998 | Srinivasan et al. | 525/240 |
| 5,880,198 | * 3/1999 | Kobayashi et al. | 524/451 |
| 5,889,099 | * 3/1999 | Nagai et al. | 524/451 |
| 5,914,363 | * 6/1999 | Sadatoshi et al. | 524/451 |
| 5,965,654 | * 10/1999 | Hirata et al. | 525/240 |
| 6,180,709 | * 1/2001 | Nishio et al. | 524/451 |

FOREIGN PATENT DOCUMENTS

| | | |
|---|---|---|
| A6 192500 | 7/1994 | (JP) . |
| A6 248156 | 9/1994 | (JP) . |
| A8 120129 | 5/1996 | (JP) . |

OTHER PUBLICATIONS

Translation of: Kakugo et al., "Impact–Resistant Polypropylene", Sumitomo Kagaku, pp. 22–32 (1979–1).*

* cited by examiner

Primary Examiner—Donald R. Wilson
(74) Attorney, Agent, or Firm—Birch, Stewart, Kolasch & Birch, LLP

(57) ABSTRACT

A polypropylene-based resin composition comprising:
(1) 95 to 50% by weight of a polypropylene-based resin (A) of a mixture of the following (i) and (ii);
  (i) a crystalline propylene-ethylene block copolymer comprising a propylene homopolymer portion as a first segment and a propylene-ethylene random copolymer as a second segment, said propylene-ethylene block copolymer having a melt flow rate at 230° C. measured according to JIS-K-6758 of not less than 25 g/10 min., and
  (ii) a crystalline propylene homopolymer having a melt flow rate at 230° C. measured according to JIS-K-6758 of not less than 70 g/10 min.;
(2) 5 to 20% by weight of at least one rubber (B) selected from the following rubbers (a) and (b);
  (a) an ethylene-α-olefin copolymer rubber,
  (b) an alkenyl aromatic compound-containing rubber; and
(3) 0 to 30% by weight of talc (C) having an average particle diameter of not more than 3 μm, the total amount of (A), (B) and (C) being 100% by weight, wherein said polypropylene-based resin composition satisfies the following expression:

$$0.05 \leq \{(A)'/[(A)'+(a')+(b')]\} \leq 0.20$$

in which (A)' represents an amount of the second segment in the polypropylene-based resin composition, (a') represents an amount of the ethylene-α-olefin copolymer rubber in the polypropylene-based resin composition, and (b') represents an amount of the alkenyl aromatic compound-containing rubber in the polypropylene-based resin composition, and wherein the melt flow rate at 230° C. measured according to JIS-K-6758 of said polypropylene-based resin composition is not less than 35 g/ 10 min. and the flexural modulus at 23° C. is not less than 8000 kg/cm$^2$.

4 Claims, No Drawings

POLYMER BLEND COMPOSITIONS BASED ON ISOTACTIC POLYPROPYLENE HOMOPOLYMER AND INJECTED MOLDED ARTICLES THEREOF

BACKGROUND OF THE INVENTION

1. Field of the Invention

The present invention relates to a polypropylene-based resin composition and an injection molded article thereof. More particularly, it relates to a polypropylene-based resin composition having an excellent flowability because of its specific rubber component and specific composition ratio, as well as excellent rigidity and impact resistance in physical properties, which is particularly useful as a molded article, and an injection molded article thereof.

2. Prior Art

Crystalline propylene-ethylene block copolymers have recently been used as automobile materials and domestic electric appliance materials in view of lightening and cost saving. However, conventional crystalline propylene-ethylene block copolymer materials had a low impact strength and contained a large amount of an inorganic filler to impart thermal properties such as heat distortion temperature. Therefore, a specific gravity was relatively high.

For example, in JP-A-53-22552 and JP-A-53-40045, it is disclosed to incorporate an ethylene-propylene copolymer rubber into a crystalline propylene-ethylene block copolymer to improve the impact strength. However, the rigidity, thermal properties such as heat distortion temperature, etc. and flowability are inferior because the ethylene-propylene copolymer rubber is incorporated. Furthermore, for example, in JP-A-51-136735, JP-A-53-64256, JP-A-53-64257, JP-A-57-55952, JP-A-57-207630, JP-A-58-17139, JP-A-58-111846, JP-A-59-98157, or JP-B-55-3374, it is disclosed to incorporate inorganic fillers such as calcium carbonate, barium sulfate, mica, crystalline calcium silicate, talc, etc. to improve the thermal properties. However, the flowability was liable to becomes inferior by adding the inorganic filler.

In such way, it has been required to develop a material having a good flowability while maintaining good balance between the impact strength and rigidity, and many proposals have been done. However, properties of the proposed materials have been insufficient.

SUMMARY OF THE INVENTION

Under these situations, an object of the present invention is to provide a polypropylene-based resin composition having a good flowability and good balance between impact strength and rigidity in comparison with the conventional polypropylene-based resin composition obtained by incorporating an ethylene-propylene copolymer rubber, and an injection molded article thereof.

The present inventors have intensively studied. As a result, the present inventors have found that the above object of the present invention can be accomplished by using a polypropylene resin as a main component and adding a specific rubber component to this resin at a specific composition ratio. Thus, the present invention has been completed.

According to the present invention, there is provided a polypropylene-based resin composition comprising:

(1) 95 to 50% by weight of a polypropylene-based resin (A) composed of the following (i) and (ii);
  (i) a crystalline propylene-ethylene block copolymer (referred to simply as "propylene-ethylene block copolymer", hereinafter) comprising a propylene homopolymer portion as a first segment and a propylene-ethylene random copolymer as a second segment, said propylene-ethylene block copolymer having a melt flow rate at 230° C. measured according to JIS-K-6758 of not less than 25 g/10 min., and
  (ii) a crystalline propylene homopolymer (referred to simply as "propylene homopolymer", hereinafter) having a melt flow rate at 230° C. measured according to JIS-K-6758 of not less than 70 g/10 min.;
(2) 5 to 20% by weight of at least one rubber (B) selected from the following rubbers (a) and (b);
  (a) an ethylene-α-olefin copolymer rubber, and
  (b) an alkenyl aromatic compound-containing rubber; and
(3) 0 to 30% by weight of talc having an average particle diameter of not more than 3 μm, the total amount of (1) to (3) being 100% by weight, wherein said polypropylene-based resin composition satisfies the following expression:

$$0.05 \leq \{(A)'/[(A)'+(a')+(b')]\} \leq 0.20$$

in which (A)' represents an amount by weight of the second segment of the crystalline propylene-ethylene block copolymer (i) in the polypropylene-based resin composition, (a') represents an amount by weight of the ethylene-α-olefin copolymer rubber in the polypropylene-based resin composition, and (b') represents an amount of the alkenyl aromatic compound-containing rubber in the polypropylene-based resin composition, and
wherein the melt flow rate at 230° C. measured according to JIS-K-6758 of said polypropylene-based resin composition is not less than 35 g/10 min. and the flexural modulus at 23° C. is not less than 8000 kg/cm².

Furthermore, the present invention provides a molded article obtained by injection molding the polypropylene-based resin composition described above.

DETAILED DESCRIPTION OF THE INVENTION

The present invention will be described in detail below.

In the present invention, the polypropylene-based resin (A) is a mixture of the above (i) and (ii). The proportion of (i) to (ii) is not specifically limited, but the proportion is preferably 10 to 40% by weight of the (i) to 90 to 60% by weight of the (ii) (provided that the total of (i) and (ii) is 100% by weight).

In the polypropylene-based resin (A) used in the present invention, the Q value as a ratio of weight average molecular weight (Mw)/number average molecular weight (Mn), which represents a molecular distribution of a propylene homopolymer portion of polypropylene-based resin (A) according to gel permeation chromatography (GPC) method, is preferably from 3.0 to 5.0, more preferably from 3.5 to 4.5. When the Q value is less than 3.0, the flowability of the polypropylene-based resin composition sometimes becomes inferior. On the other hand, when the Q value exceeds 5.0, preferable results are not sometimes obtained in balance between the rigidity and impact resistance. The term "propylene homopolymer portion of polypropylene-based resin (A)" used herein refers to the first segment portion of the propylene-ethylene block copolymer (i), and the propylene homopolymer (ii).

In addition, particularly preferable properties of the propylene homopolymer (ii) in the polypropylene-based resin (A) are as follows.

That is, as described above, the Q value is preferably from 3.0 to 5.0, more preferably from 3.5 to 4.5, and the isotactic pentad fraction calculated by $^{13}$C-NMR is preferably not less than 0.97, more preferably not less than 0.98. When the isotactic pentad fraction is less than. 0.97, it is sometimes difficult to satisfy the desired rigidity, heat resistance, etc. The melt flow rate at 230° measured according to JIS K6758 (referred to as "MFR at 230° C." herein-after) is not less than 70 g/10 min., preferably not less than 80 g/10 min. When the MFR at 230° C. is less than 70 g/10 min., the flowability becomes poor.

In the propylene-ethylene block copolymer (i) composed of the propylene homopolymer portion as the first segment and the propylene-ethylene random copolymer portion as the second segment, particularly desired properties, composition, etc., are as follows.

The MFR at 230° C. of the propylene-ethylene block copolymer (i) is not less than 25 g/10 min., preferably not less than 30 g/10 min. In the propylene-ethylene block copolymer (i), the properties described below of the propylene homopolymer portion as the first segment are the same as those in case of the above propylene homopolymer (ii). That is, the Q value is preferably from 3.0 to 5.0, more preferably from 3.5 to 4.5, and the isotactic pentad fraction calculated by $^{13}$C-NMR is preferably not less than 0.97, more preferably not less than 0.98.

The propylene-ethylene block copolymer (i) can be obtained by a known method, for example, by a method of polymerizing propylene in the presence of a stereoregular olefin in polymerization catalyst to produce the first segment in the first step and subsequently random copolymerizing ethylene and propylene to produce the second segment in the second step. The block copolymer can be produced by a slurry polymerization method or a gas phase polymerization method.

The propylene-ethylene block copolymer is substantially a composition of the propylene homopolymer portion as the first segment and the propylene-ethylene random copolymer portion as the second segment.

The propylene homopolymer portion as the first segment of the propylene-ethylene block copolymer (i) can be sampled by taking out a part of the propylene homopolymer portion from a polymerization vessel after the polymerization of propylene in the first step, and its [η]p, etc. can be determined.

The content of the propylene-ethylene random copolymer portion as the second segment in the propylene-ethylene block copolymer (i) is normally from 5 to 40% by weight, preferably from 10 to 30% by weight.

The ethylene content (C2')EP of the propylene-ethylene random copolymer portion is preferably from 25 to 55% by weight, more preferably from 30 to 50% by weight. When the ethylene content is less than 25% by weight or exceeds 55% by weight, preferable results with respect to the impact resistance of the composition are not obtained, sometimes. The intrinsic viscosity of the propylene-ethylene random copolymer portion [η]EP is preferably from 3.0 to 6.0 dl/g, more preferably from 4.0 to 6.0 dl/g. When the intrinsic viscosity is less than 3.0 dl/g, preferable results are not obtained in balance between the rigidity and impact resistance, sometimes. On the other hand, when the intrinsic viscosity exceeds 6.0 dl/g, granule structure is sometimes formed and preferable results are not obtained in quality of the surface, sometimes.

Then, the measuring method of the above properties will be described. The isotactic pentad fraction is the fraction of propylene monomer unit existing at the center of the isotactic chain in the form of a pentad unit, in other words, the chain in which five propylene monomer units are successively meso-bonded, in the crystalline polypropylene molecular chain as measured by the method disclosed by A. Zambelli et al. in Macromolecules, 6, 925 (1973), namely by use of $^{13}$C-NMR. However, the assignment of NMR absorption peak is determined according to the method proposed in Macromolecules, 8, 687 (1975) published thereafter.

Specifically, the isotactic pentad fraction is measured as an area fraction of mmmm peak in the total absorption peaks in the methyl carbon region of $^{13}$C-NMR spectrum. When the isotactic pentad fraction of NPL standard substance CRM No. M19-14 Polypropylene PP/MWD/2 of NATIONAL PHYSICAL LABORATORY in U.K. was measured by this method, it was 0.944.

In the propylene-ethylene block copolymer (i), the weight ratio X of the propylene-ethylene random copolymer portion to the whole block copolymer can be determined by measuring each heat of fusion of crystal of the propylene homopolymer portion and whole block copolymer, and calculating according to the following equation;

$$X=1-(\Delta Hf)T/(\Delta Hf)P$$

(ΔHf)T: heat of fusion of whole block copolymer (cal/g)

(ΔHf)P: heat of fusion of propylene homopolymer portion (cal/g).

The ethylene content of the propylene-ethylene random copolymer portion can be determined by measuring the ethylene content (% by weight) of the whole block copolymer according to the infrared absorption spectrometry, and calculating according to the following equation:

$$(C2')EP=(C2')T/X$$

(C2')T: ethylene content of the whole block copolymer (% by weight)

(C2')EP: ethylene content of the propylene-ethylene random copolymer portion(% by weight)

Moreover, in the propylene-ethylene block copolymer (i), the intrinsic viscosity [η]EP of the propylene-ethylene random copolymer portion can be determined by calculating from each intrinsic viscosity measured of the homopolymer portion and whole block copolymer according to the following equation.

$$[\eta]EP=[\eta]T/X-(1/X-1)\,[\eta]P$$

[η]P: intrinsic viscosity of propylene homopolymer portion (dl/g)

[η]T: intrinsic viscosity of whole block copolymer (dl/g)

Examples of the ethylene-α-olefin-based copolymer rubber (a) used in the present invention include ethylene-α-olefin copolymer rubbers and ethylene-α-olefin-non-conjugated diene copolymer rubbers. These ethylene-α-olefin copolymer rubbers can be used alone or in combination of two or more thereof.

Examples of the α-olefin in the ethylene-α-olefin-based copolymer rubber (a) include α-olefin having 3 to 20 carbon atoms, preferably 3 to 12 carbon atoms such as propylene, 1-butene, isobutene, 1-pentene, 2-methyl-1-pentene, 3-methyl-1-butene, 1-hexene, 2-methyl-1-pentene, 3-methyl-1-pentene, 4-methyl-1-pentene, 1-octene, 1-nonene, 1-decene, 1-undecene, 1-dodecene, etc., and these α-olefins may be used in combination. Among them, 1-hexene and 1-octene are particularly preferred. Examples of the non-conjugated diene as the third component include 5-ethylidene-2-norbornene, dicyclopentadiene, 1,4-hexadiene and the like.

The ethylene-α-olefin-based copolymer rubber (a) used in the present invention has a the melt flow rate at 190° C. measured under a load of 2.16 kg according to JIS K 6758 (referred to as "MFR at 190° C." herein-after) of 0.5 to 10 g/10 min. When the MFR at 190° C. exceeds 10 g/10 min., preferable results can not be obtained with respect to the impact strength, sometimes. When the MFR at 190° C. is less than 0.5 g/10 min., preferable results are not obtained with respect to the impact strength, sometimes, because of poor dispersion of the rubber (a) in the polypropylene-based resin(A).

The ethylene-α-olefin copolymer rubber (a) can be obtained by the method disclosed in JP-B-43-13052, that is, a method of copolymerizing ethylene with α-olefin and, if necessary, further with a non-conjugated diene as the third component in an inert organic solvent such as a hydrocarbon using a Ziegler-Natta catalyst of a vanadium compound and an organoaluminum compound and a halogenated ester compound. It can also be obtained by copolymerizing ethylene with the α-olefin using a known catalyst comprising a known metallocene compound coordinated in titanium, zirconium or hafnium and an alumoxane, i.e. so-called metallocene catalyst.

Examples of the alkenyl aromatic compound-containing rubber (b) used in the present invention include rubbers obtained by combining an olefin copolymer rubber or a conjugated rubber with an alkenyl aromatic compound by polymerization, reaction or the like, for example, block or random copolymers such as styrene-butadiene random copolymer rubber (SBR), styrene-butadiene-styrene block copolymer rubber (SBS), styrene-isoprene-styrene block copolymer rubber (SIS); or block or random copolymer wherein a diene component of these copolymers is hydrogenated, such as rubber in which the butadiene block of the styrene-butadiene-styrene block copolymer is hydrogenated (SEBS). Among them, the hydrogenated styrene-butadiene-styrene block copolymer rubber (SEBS) is particularly preferred. Moreover, a rubber obtained by reacting an ethylene-α-olefin-non-conjugated diene copolymer rubber with an alkenyl aromatic compound such as styrene can also be preferably used.

In the present invention, it is necessary that the content of the component (B) is from 5 to 20% by weight.

When the content is less than 5% by weight, the impact strength of the resulting composition is inferior. On the other hand, when the content exceeds 20% by weight, the rigidity is inferior.

In the present invention, 0 to 30% by weight of talc can be optionally contained for the purpose of improving the rigidity of the polypropylene-based resin composition. The average particle diameter of talc (C) used is not more than 3 μm. When the average particle size is not less than 3 μm, the decrease in impact strength is large, and the appearance such as gloss becomes inferior. On the other hand, when the content of talc exceeds 30% by weight, the impact strength is drastically lowered, unfavorably. Talc may be used without subjecting to any treatment, but there can be used those obtained by treating with a surface treating agent selected from silane coupling agents, titanium coupling agents, higher fatty acids, higher fatty acid esters, higher fatty acid amides, higher fatty acid salts and other surfactants, which are normally known as those added for the purpose of improving the interfacial adhesion with the polypropylene-based resin and improving the dispersability.

The average particle diameter of talc means 50% corresponding particle diameter (D50) determined from an integration distribution curve of under sieve method measured by dispersing talc in a dispersion medium such as water, an alcohol or the like using a centrifugal sedimentation type particle size distribution measuring instrument.

The polypropylene-based resin composition of the present invention must satisfy the following expression:

$$0.05 \leq \{(A)'/[(A)'+(a)+(b')]\} \leq 0.20,$$

wherein (A') represents an amount by weight of the second segment of the crystalline propylene-ethylene block copolymer (i) in the polypropylene-based resin composition, (a') represents an amount by weight of the ethylene-α-olefin copolymer rubber in the polypropylene-based resin composition, and (b') represents an amount by weight of the alkenyl aromatic compound-containing rubber in the polypropylene-based resin composition. Preferably, the polypropylene-based resin composition satisfies the following expression:

$$0.10 \leq \{(A)'/[(A)'+(b')]\} \leq 0.20.$$

When it is less than 0.05 or exceeds 0.20, preferable results are not obtained with respect to the impact strength.

The MFR at 230° C. of the polypropylene-based resin composition of the present invention is not less than 35 g/10 min. When the MFR is less than 35 g/10 min, the flowability is inferior and preferable results are not obtained in view of the molding cycle and the like.

The flexural modulus at 23° C. of the polypropylene-based resin composition of the present invention is not less than 8000 Kg/cm$^2$. When the flexural modulus at 23° C. is less than 8000 Kg/cm$^2$, preferable shape as a molded article is not obtained because of insufficient rigidity.

The composition of the present invention can be produced by using a kneader such as a single screw extruder, twin screw extruder, Banbury mixer, heat roll or the like. Mixing of each component may be carried out at one time or in several portions. Examples of the method of adding in several portions include a method of kneading a polypropylene-based resin (A) with talc (C), and then adding an ethylene-α-olefin copolymer rubber (a) and/or an alkenyl aromatic compound-containing rubber (b); a method of previously kneading high concentration of talc (C) with a polypropylene-based resin (A) to obtain a master batch and then kneading the master batch with diluting with a polypropylene-based resin(A), or ethylene-α-olefin copolymer rubber (a) and/or an alkenyl aromatic compound-containing rubber (b). As the second method of adding in several portions, there can be preferably used a method of kneading a polypropylene-based resin (A) with an ethylene-α-olefin copolymer rubber (a) and/or an alkenyl aromatic compound-containing rubber (b) and then adding talc (C) to the above polymer mixture, followed by kneading the mixture; and a method of previously kneading an ethylene-α-olefin copolymer rubber (a) and/or an alkenyl aromatic compound-containing rubber (b) with a polypropylene-based resin(A) at the high concentration to produce a master batch, and then adding a polypropylene-based resin(A) and talc (C) to the master batch, and then kneading the mixture. The third method of adding in several portions includes a method of kneading a polypropylene-based resin(A) and talc (C), and a polypropylene-based resin(A) and an ethylene-α-olefin copolymer rubber (a) and/or an alkenyl aromatic compound-containing rubber (b), respectively, and combining and kneading both mixtures. The temperature required for kneading is usually from 170 to 250° C., and the time is usually from 1 to 20 min.

Moreover, it is possible to optionally incorporate additives such as antioxidants, ultraviolet light absorbers, lubricants, pigments, anti-static agents, copper harm preventing agent, flame retardants, neutralizing agents, foaming agents, plasticizers, nucleating agents, defoamers, crosslinking agents, etc., in addition to these basic components, in the kneader.

The polypropylene-based resin composition of the present invention can be molded into an injection molded article by injection molding which is normally employed. This injection molded article can be used suitably used as a molded article for automobile and domestic electric appliance.

EXAMPLE

The present invention is explained in more detail using the following Examples but not limited thereto.

The measuring methods of the properties in the Examples are shown below.

(1) Melt Flow Rate (MFR)

It was measured according to JIS K 6758. Unless otherwise stated, the measurement was performed at a measuring temperature of 230° C. under a load of 2.16 kg.

(2) Bending Test

It was carried out according to JIS K 7203. A test piece molded by injection molding was used. The thickness of the test piece was 6.4 mm and the flexural modulus was evaluated under the condition of a span strength of 10 mm and a loading rate of 2.0 mm/min. The measuring temperature was set to 23° C.

(3) Izod Impact Strength

It was measured according to JIS K 7110. A test piece molded by injection molding was used. The thickness of the test piece was 6.4 mm and the impact strength of the test piece with a notch obtained by processing after molding was evaluated. The measuring temperature was set to 23° C.

(4) Brittleness Temperature

It was measured according to JIS K 6758. A test piece having a size of 6.3×38×2 mm is obtained by punching from a flat plate having a size of 25×150×2 mm obtained by molding by injection molding.

(5) Ethylene and Propylene Content

The ethylene and propylene contents were determined as follows. That is, the infrared absorption spectrum of a press sheet was measured and each content was determined by using an absorbance of characteristic absorption of a methyl group or a methylene group, which appear in the infrared absorption spectrum, according to a calibration curve method.

(6) Intrinsic Viscosity

The reduced viscosities were measured at three concentrations of 0.1, 0.2 and 0.5 g/dl by using an Ubbelohde viscometer. The intrinsic viscosity was determined by a calculation method described in "Polymer solution, Polymer Experiment, Vol. 11" (published by Kyoritsu Shuppan Co., Ltd, 1982), page 491, i.e. an extrapolation method which comprises plotting the reduced viscosities to the concentrations and extrapolating the viscosity at a concentration to zero.

The intrinsic viscosity of the polypropylene-based resin was measured at a temperature of 135° C. in tetralin. The intrinsic viscosity of the ethylene-α-olefin copolymer rubber (a) was measured at a temperature of 70° C. in xylene.

(7) Molecular Weight Distribution (Q value)

It was measured by gel permeation chromatography (GPC) under the following conditions.

GPC: Model 150C, manufactured by Waters Co.

Column: 2 columns of Shodex 80 MA, manufactured by Showa Denko K.K.

Amount of sample: 300 $\mu$ 1(polymer concentration: 0.2% by weight)

Flow rate: 1 ml/min.

Temperature: 135° C.

Solvent: o-dichlorobenzene

A calibration curve of the elution volume and the molecular weight was made by using a standard polystyrene manufactured by Tosoh Corporation. Using the calibration curve, the weight-average molecular weight and number-average molecular weight (in terms of polystyrene) of the specimen were determined, and a Q value (weight average molecular weight/number average molecular weight) as an index of a molecular weight distribution was determined.

Test pieces for evaluation of physical properties of the above items (2), (3) and (4) were made under the following injection molding conditions. After drying the composition at 120° C. for 2 hours in a hot-air dryer, injection molding was carried out by using an injection molder, model IS150E-V, manufactured by Toshiba Machine Co., Ltd., under the conditions of a molding (molten resin) temperature of 220° C., a mold cooling temperature of 50° C., an injection time of 15 seconds and a cooling time of 30 seconds.

Moreover, the following composition was produced under the following conditions. A polypropylene-based resin(A) and 0.2 parts by weight of aluminum p-tert-butyl-benzoate as a nucleating agent were uniformly premixed in the composition described in Table 3 by using a Henschel mixer and a tumbler, and then the mixture was extruded through a twin-screw kneading extruder (Model: TEX44SS 30BW-2V, manufactured by The Japan Steel Works, Ltd.) under the conditions of an extrusion amount of 30 kg/hour and a screw revolution of 900 rpm. under bent suction.

In addition, abbreviations shown in the tables represent the followings.

BC: Propylene-ethylene block copolymer

PP: Propylene homopolymer

SEBS: Hydrogenated styrene-butadiene-styrene block copolymer rubber (styrene-ethylene-butene-styrene block copolymer rubber)

EOR: Ethylene-octene copolymer rubber

P portion: Propylene homopolymer portion in BC

EP portion: Propylene-ethylene random copolymer portion in BC

EXAMPLE 1

A test piece was obtained by kneading 16% by weight of a crystalline propylene-ethylene block copolymer (BC-1), 72% by weight of a crystalline propylene homopolymer (PP-1)and 12% by weight of SEBS (trade name: Kraton G1657, manufactured by Shell Chemical Ltd.) under predetermined conditions, followed by injection molding. The physical properties of various materials are shown in Tables 1 and 2 and the composition proportions are shown in Table 3 and, furthermore, the measurement results of he physical properties are shown in Table 4.

Comparative Example 1

A test piece was obtained by kneading 64% by weight of a crystalline propylene-ethylene block copolymer (BC-1), 32% by weight of a crystalline propylene homopolymer (PP-1) and 4% by weight of SEBS under predetermined conditions, followed by injection molding. The physical properties of various materials are shown in Tables 1 and 2 and the composition proportions are shown in Table 3 and, furthermore, the measurement results of he physical properties are shown in Table 4.

EXAMPLE 2

A test piece was obtained by kneading 22% by weight of a crystalline propylene-ethylene block copolymer (BC-2), 52% by weight of a crystalline propylene homopolymer (PP-2), 15% by weight of EOR (trade name: Engage EG8200, manufactured by Du Pont-Dow Elastomers L.L.C.) and 11% by weight of talc having an average particle diameter of 2.5μ under predetermined conditions, followed by injection molding. The physical properties of various materials are shown in Tables 1 and 2 and the composition proportions are shown in Table 3 and, furthermore, the measurement results of he physical properties are shown in Table 4.

Comparative Example 2

A test piece was obtained by kneading 55% by weight of a crystalline propylene-ethylene block copolymer (BC-2), 24% by weight of a crystalline propylene homopolymer (PP-2), 10% by weight of EOR and 11% by weight of talc having an average particle diameter of 2.5μ under predetermined conditions, followed by injection molding. The physical properties of various materials are shown in Tables 1 and 2 and the composition proportions are shown in Table 3 and, furthermore, the measurement results of he physical properties are shown in Table 4.

The Examples of the present invention are superior in flowability to Comparative Examples, and are also superior in balance between physical properties such as Izod impact strength and brittleness temperature.

TABLE 1

| | | | | EP portion | |
|---|---|---|---|---|---|
| Sample | Q Value | MFR | mmmm | [η]EP (dl/g) | Content 1 (% by weight) | Content 2 (% by weight) |
| BC-1 | 4.0 | 35 | 0.98 | 4.4 | 17 | 28 |
| BC-2 | 4.1 | 40 | 0.98 | 5.0 | 15 | 42 |
| PP-1 | 4.0 | 90 | 0.98 | | | |
| PP-2 | 4.1 | 80 | 0.98 | | | |

BC: Propylene-ethylene block copolymer
PP: Propylene homopolymer
EP portion: Propylene-ethylene random copolymer portion in BC
Content 1: EP portion content in BC
Content 2: ethylene content in EP portion
mmmm: Isotactic pentad fraction

TABLE 2

| Sample | MFR at 190° C. (g/10 min.) | Comonomer content (% by weight) | Styrene content (% by weight) |
|---|---|---|---|
| SEBS | 8 | — | 13 |
| EOR | 5 | 24 | — |

SEBS: Hydrogenated styrene-butadiene-styrene block copolymer rubber
EOR: Ethylene-octene copolymer rubber

TABLE 3

| | Composition (% by weight) | | | | | | |
|---|---|---|---|---|---|---|---|
| | BC-1 | BC-2 | PP-1 | PP-2 | SEBS | EOR | Talc |
| Example 1 | 16 | | 72 | | 12 | | |
| Example 2 | | 22 | | 52 | | 15 | 11 |
| Comparative example 1 | 64 | | 32 | | 4 | | |
| Comparative example 2 | | 55 | | 24 | | 10 | 11 |

TABLE 4

| | * | MFR | FM | Izod (23° C.) | Brittleness temperature (° C.) |
|---|---|---|---|---|---|
| Example 1 | 0.18 | 47 | 14100 | 7 | −1 |
| Example 2 | 0.18 | 37 | 21200 | 27 | — |
| Comparative Example 1 | 0.74 | 40 | 14700 | 5 | 4 |
| Comparative Example 2 | 0.45 | 22 | 21200 | 18 | — |

In the table, * represents a value of the formula: $(A)'/[(A)' + (a') + (b')]$ wherein (A)' represents an amount of the second segment in the polypropylene-based resin composition, (a') represents an amount of the ethylene-α-olefin copolymer rubber in the polypropylene-based resin composition, and (b') represents an amount of the alkenyl aromatic compound-containing rubber in the polypropylene-based resin composition.

The polypropylene-based resin composition of the present invention is superior in rigidity and impact strength, and is also superior in flowability. The polypropylene-based resin composition provided by the present invention can be suitably used in an injection molded article by utilizing these physical properties.

What is claimed is:
1. A polypropylene-based resin composition comprising:
   (1) 95 to 50% by weight of a polypropylene-based resin (A) composed of the following (i) and (ii);
      (i) a crystalline polypropylene composition obtained by polymerizing propylene in the presence of a stereoregular polymerization catalyst thereby to produce a crystalline propylene homopolymer as a first segment, and subsequently copolymerizing ethylene and propylene to produce a propylene-ethylene random copolymer as a second segment, said crystalline polypropylene composition having a melt flow rate (MFR) at 230° C. measured according to JIS-K-6758 of not less than 25 g/10 min., wherein the first segment (i) has a Q value of from 3.0 to 5.0, and an isotactic pentad fraction of not less than 0.97, the second segment has an ethylene content of from 25 to 55% by weight and an intrinsic viscosity (η)EP of from 3.0 to 6.0 dl/g, and
      (ii) a crystalline propylene homopolymer having a melt flow rate at 230° C. measured according to JIS-K-6758 of not less than 70 g/10 min., the crystalline propylene homopolymer (ii) has a Q value of from 3.0 to 5.0 and an isotactic pentad fraction of not less than 0.97;
   (2) 5 to 20% by weight of a rubber (B) selected from the group consisting of an ethylene-α-olefin copolymer rubber (a) selected from the group consisting of an ethylene-1-hexene copolymer rubber and ethylene-1-octene copolymer rubber, and a mixture of an alkenyl aromatic compound-containing rubber (b) with the ethylene-α-olefin copolymer (a), wherein the rubber (a) is an ethylene-α-olefin copolymer rubber having a melt flow index measured at 190° C. under a load of 2.16 kg according to JIS K6758 of 0.5 to 10 g/10 min.; and (3) 0 to 30% by weight of talc (C) having an average particle diameter of not more than 3 μm, the total amount of (A), (B) and (C) being 100% by weight, wherein said polypropylene-based resin composition satisfies the following expression:

$$0.05 \leq ((A)'/((A)'+(a')+(b'))) \leq 0.20,$$

wherein (A)' represents an amount by weight of the propylene random copolymer as the second segment of the (i) in the polypropylene-based resin composition, (a') represents an amount by weight of the ethylene-α-olefin copolymer rubber (a) in the polypropylene-based resin composition, and (b') represents an amount by weight of the alkenyl aromatic compound-containing rubber in the polypropylene-based resin composition, and wherein the melt flow rate at 230° C. measured according to JIS-K-6758 of said polypropylene-based resin composition is not less than 35 g/10 min. and the flexural modulus at 23° C. is not less than 8000 kg/cm$^2$.

2. The polypropylene-based resin composition according to claim 1, wherein the rubber (B) is (a) the ethylene-α-olefin copolymer rubber (a).

3. The polypropylene-based resin composition according to claim 1, wherein the alkenyl aromatic compound-containing rubber (b) is a hydrogenated styrene-butadiene-styrene block copolymer rubber.

4. A molded article obtained by injection molding the polypropylene-based resin composition of claim 1.

* * * * *